(12) United States Patent
He

(10) Patent No.: US 11,129,075 B2
(45) Date of Patent: Sep. 21, 2021

(54) METHOD FOR SWITCHING IMS VOICE CALL NETWORK, STORAGE DEVICE, AND MOBILE TERMINAL

(71) Applicant: JRD Communication (Shenzhen) LTD., Shenzhen (CN)

(72) Inventor: Jiancai He, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 6 days.

(21) Appl. No.: 16/637,756

(22) PCT Filed: Aug. 9, 2018

(86) PCT No.: PCT/CN2018/099619
§ 371 (c)(1),
(2) Date: Feb. 9, 2020

(87) PCT Pub. No.: WO2019/029618
PCT Pub. Date: Feb. 14, 2019

(65) Prior Publication Data
US 2020/0187080 A1 Jun. 11, 2020

(30) Foreign Application Priority Data
Aug. 9, 2017 (CN) .......................... 201710675036.3

(51) Int. Cl.
*G08C 17/00* (2006.01)
*H04W 36/30* (2009.01)
(Continued)

(52) U.S. Cl.
CPC ......... *H04W 36/30* (2013.01); *H04L 65/1016* (2013.01); *H04W 36/14* (2013.01); *H04W 52/0245* (2013.01)

(58) Field of Classification Search
CPC . H04W 36/30; H04W 36/14; H04W 52/0245; H04W 36/0083; H04W 36/0022;
(Continued)

(56) References Cited

U.S. PATENT DOCUMENTS 9,319,943 B2 * 4/2016 Lee .................. H04W 36/0022
9,768,893 B1 * 9/2017 Wank ..................... H04B 17/16
(Continued)

FOREIGN PATENT DOCUMENTS

CN 101170835 4/2008
CN 102118763 7/2011
(Continued)

OTHER PUBLICATIONS

International Search Report and the Written Opinion dated Oct. 26, 2018 From the International Searching Authority Re. Application No. PCT/CN2018/099619 and Its Translation of Search Report Into English. (9 Pages).

*Primary Examiner* — Amancio Gonzalez

(57) ABSTRACT

A method for switching an IMS voice call network includes: identifying a call network which is currently used by a mobile terminal when an IMS voice call is executed by the mobile terminal; switching a VoLTE network which is currently used by the mobile terminal to a VoWiFi network when the call network is the VoLTE network, a use time of the VoLTE network is greater than a timeout time, and a signal intensity of the VoWiFi network reaches a preset first signal threshold value; and switching the VoWiFi network which is currently used by the mobile terminal to the VoLTE network when the call network is the VoWiFi network and a signal intensity of the VoLTE network reaches a preset second signal threshold value. A storage device and a mobile terminal are also provided.

17 Claims, 2 Drawing Sheets

(51) Int. Cl.
*H04L 29/06* (2006.01)
*H04W 36/14* (2009.01)
*H04W 52/02* (2009.01)

(58) Field of Classification Search
CPC .............. H04W 88/06; H04W 36/0011; H04L 65/1016; H04L 65/1083; Y02D 30/70
USPC .......................................................... 370/311
See application file for complete search history.

(56) References Cited

U.S. PATENT DOCUMENTS

| | | |
|---|---|---|
| 9,906,566 B2 * | 2/2018 | Purkop ................. H04M 7/006 |
| 9,924,386 B2 * | 3/2018 | Jain ..................... H04L 41/5038 |
| 10,051,523 B2 * | 8/2018 | Kim .................... H04L 65/1069 |
| 10,225,777 B2 * | 3/2019 | Singh .................... H04W 36/16 |
| 10,341,904 B2 | 7/2019 | Weingertner |
| 10,361,953 B1 * | 7/2019 | Bonn .................. H04L 65/1006 |
| 10,517,021 B2 * | 12/2019 | Feldman ............. H04L 65/1006 |
| 2014/0120916 A1 | 5/2014 | Du et al. |
| 2017/0181048 A1 * | 6/2017 | Shah ................... H04L 65/1016 |
| 2017/0223597 A1 * | 8/2017 | Telang ................. H04W 36/24 |
| 2018/0124124 A1 * | 5/2018 | Corona ................ H04L 65/105 |
| 2018/0206153 A1 * | 7/2018 | Qu ..................... H04M 15/8038 |

FOREIGN PATENT DOCUMENTS

| | | |
|---|---|---|
| CN | 106028409 | 10/2016 |
| CN | 106658622 | 5/2017 |
| CN | 106804051 | 6/2017 |
| CN | 106851756 | 6/2017 |
| CN | 107396412 | 11/2017 |
| WO | WO 2019/029618 | 2/2019 |

\* cited by examiner

METHOD FOR SWITCHING IMS VOICE CALL NETWORK, STORAGE DEVICE, AND MOBILE TERMINAL

This application is a National Phase of PCT Patent Application No. PCT/CN2018/099619 having International filing date of Aug. 9, 2018 which claims the priority of Chinese Patent Application No. 201710675036.3, filed on Aug. 9, 2017. The contents of the above applications are all incorporated by reference as if fully set forth herein in their entirety.

FIELD AND BACKGROUND OF THE INVENTION

The present disclosure relates to a technology field of mobile terminals, and more particularly to a method for switching an IMS voice call network, a storage device, and a mobile terminal.

With the rapid popularization of mobile terminals, the mobile terminals have become an essential tool of production, entertainment, and communication in people's daily life. The mobile terminals provide convenience for the people's life so much.

An IP Multimedia Subsystem (IMS) is a new type of multimedia services. It can meet new and various requirements of the multimedia services of the mobile terminals of users. Currently, IMS is considered to be a core technology of a next generation network. IMS is also an important way to solve combinations of the mobile terminals and landlines and produce differentiated services of combinations of voice, data, and videos.

In the prior art, an IMS voice system is a new built technology and includes two voice services: VoLTE and VoWiFi. VoWiFi is a type of technology which processes an IMS call depending on WiFi. A signal coverage range of a single WiFi signal is relatively small and has certain limitations. In the prior art, a call network is switched when a mobile terminal searches for a VoWiFi network. This might lead to a situation that signals are poor after the mobile terminal is switched to the VoWiFi network, and quality of the call is affected. Furthermore, when a user is out of the signal coverage range of the WiFi signal during the IMS call, the call is switched to a VoLTE network from the VoWiFi network. As such, the mobile terminal is switched between the VoLTE network and the VoWiFi network frequently, the quality of the call is affected, and power consumption of the mobile terminal is wasted.

Consequently, the prior art needs to be improved and developed.

SUMMARY OF THE INVENTION

Embodiments of the present disclosure provide a method for switching the IMS voice call network, a storage device, and a mobile terminal capable of avoiding a situation that a call network of the mobile terminal is frequently switched between a VoLTE network and a VoWiFi network during an IMS voice call, improving quality of a call and decreasing power consumption of the mobile terminal.

In a first aspect, an embodiment of the present disclosure provides a method for switching an IMS voice call network, including:

identifying a call network which is currently used by a mobile terminal when an IMS voice call is executed by the mobile terminal;

switching a VoLTE network which is currently used by the mobile terminal to a VoWiFi network when the call network is the VoLTE network, a use time of the VoLTE network is greater than a timeout time, and a signal intensity of the VoWiFi network reaches a preset first signal threshold value; and switching the VoWiFi network which is currently used by the mobile terminal to the VoLTE network when the call network is the VoWiFi network and a signal intensity of the VoLTE network reaches a preset second signal threshold value.

Further, in the method for switching the IMS voice call network, the timeout time is a Fibonacci sequence of a number of switching the call network.

Further, in the method for switching the IMS voice call network, before the step of identifying the call network which is currently used by the mobile terminal when the IMS voice call is executed by the mobile terminal, the method further includes:

presetting the first signal threshold value configured to determine whether to switch the call network from the VoLTE network to the VoWiFi network; and presetting the second signal threshold value configured to determine whether to switch the call network from the VoWiFi network to the VoLTE network.

Further, in the method for switching the IMS voice call network, the step of identifying the call network which is currently used by the mobile terminal when the IMS voice call is executed by the mobile terminal includes:

initiating an IMS voice call function when the mobile terminal receives an operational command; and acquiring and identifying the call network which is currently used by the mobile terminal.

Further, in the method for switching the IMS voice call network, the step of switching the VoLTE network which is currently used by the mobile terminal to the VoWiFi network when the call network is the VoLTE network, the use time of the VoLTE network is greater than the timeout time, and the signal intensity of the VoWiFi network reaches the preset first signal threshold value includes:

calculating the use time of the VoLTE network and determining whether the use time of the VoLTE network is greater than the timeout time when it is identified that the call network which is currently used by the mobile terminal is the VoLTE network;

acquiring the current signal intensity of the VoWiFi network and comparing the current signal intensity of the VoWiFi network to the preset first signal threshold value when the use time of the VoLTE network is greater than the timeout time; otherwise, calculating the use time of the VoLTE network again and determining whether the use time of the VoLTE network is greater than the timeout time; and switching the VoLTE network which is currently used by the mobile terminal to the VoWiFi network when the current signal intensity of the VoWiFi network is greater than or equal to the first signal threshold value; otherwise, acquiring the current signal intensity of the VoWiFi network again and comparing the current signal intensity of the VoWiFi network to the preset first signal threshold value.

Further, in the method for switching the IMS voice call network, after the step of switching the VoLTE network which is currently used by the mobile terminal to the VoWiFi network when the current signal intensity of the VoWiFi network is greater than or equal to the first signal threshold value, the method further includes:

increasing a number of switching the call network by one and recording a current time at which the call network is switched after the call network of the mobile terminal is switched from the VoLTE network to the VoWiFi network.

Further, in the method for switching the IMS voice call network, the step of calculating the use time of the VoLTE network and determining whether the use time of the VoLTE network is greater than the timeout time when it is identified that the call network which is currently used by the mobile terminal is the VoLTE network includes:

acquiring a current time, time at which the call network is switched the last time, and a number of switching the call network when it is identified that the call network which is currently used by the mobile terminal is the VoLTE network;

calculating a time difference between the current time and the time at which the call network is switched the last time, wherein the time difference is the use time of the VoLTE network; and calculating the timeout time according to the acquired number of switching the call network, wherein the timeout time is a Fibonacci sequence of the number of switching the call network.

Further, in the method for switching the IMS voice call network, the step of switching the VoWiFi network which is currently used by the mobile terminal to the VoLTE network when the call network is the VoWiFi network and the current signal intensity of the VoLTE network reaches the preset second signal threshold value includes:

acquiring the current signal intensity of the VoLTE network and comparing the current signal intensity of the VoLTE network to the preset second signal threshold value when it is identified that the call network which is currently used by the mobile terminal is the VoWiFi network; and switching the VoWiFi network which is currently used by the mobile terminal to the VoLTE network when the current signal intensity of the VoLTE network is greater than or equal to the second signal threshold value; otherwise, acquiring the current signal intensity of the VoLTE network again and comparing the current signal intensity of the VoLTE network to the preset second signal threshold value.

In a second aspect, an embodiment of the present disclosure provides a storage device storing instructions, wherein the instructions are loaded and executed by a processor to perform operations of:

identifying a call network which is currently used by a mobile terminal when an IMS voice call is executed by the mobile terminal;

switching a VoLTE network which is currently used by the mobile terminal to a VoWiFi network when the call network is the VoLTE network, a use time of the VoLTE network is greater than a timeout time, and a signal intensity of the VoWiFi network reaches a preset first signal threshold value; and switching the VoWiFi network which is currently used by the mobile terminal to the VoLTE network when the call network is the VoWiFi network and a signal intensity of the VoLTE network reaches a preset second signal threshold value.

Further, in the storage device, the timeout time is a Fibonacci sequence of a number of switching the call network.

Further, in the storage device, the step of switching the VoLTE network which is currently used by the mobile terminal to the VoWiFi network when the call network is the VoLTE network, the use time of the VoLTE network is greater than the timeout time, and the signal intensity of the VoWiFi network reaches the preset first signal threshold value includes:

calculating the use time of the VoLTE network and determining whether the use time of the VoLTE network is greater than the timeout time when it is identified that the call network which is currently used by the mobile terminal is the VoLTE network;

acquiring the current signal intensity of the VoWiFi network and comparing the current signal intensity of the VoWiFi network to the preset first signal threshold value when the use time of the VoLTE network is greater than the timeout time; otherwise, calculating the use time of the VoLTE network again and determining whether the use time of the VoLTE network is greater than the timeout time; and switching the VoLTE network which is currently used by the mobile terminal to the VoWiFi network when the current signal intensity of the VoWiFi network is greater than or equal to the first signal threshold value; otherwise, acquiring the current signal intensity of the VoWiFi network again and comparing the current signal intensity of the VoWiFi network to the preset first signal threshold value.

Further, in the storage device, the step of calculating the use time of the VoLTE network and determining whether the use time of the VoLTE network is greater than the timeout time when it is identified that the call network which is currently used by the mobile terminal is the VoLTE network includes:

acquiring a current time, time at which the call network is switched the last time, and a number of switching the call network when it is identified that the call network which is currently used by the mobile terminal is the VoLTE network;

calculating a time difference between the current time and the time at which the call network is switched the last time, wherein the time difference is the use time of the VoLTE network; and calculating the timeout time according to the acquired number of switching the call network, wherein the timeout time is a Fibonacci sequence of the number of switching the call network.

In a third aspect, an embodiment of the present disclosure provides a mobile terminal including a processor and a storage device communicating with and connected to the processor, wherein the storage device is configured to store instructions, and the processor is configured to call the instructions in the storage device to perform operations of:

identifying a call network which is currently used by the mobile terminal to determine that the call network which is currently used is a VoWiFi network or a VoLTE network when an IMS voice call is executed by the mobile terminal;

switching the VoLTE network which is currently used by the mobile terminal to the VoWiFi network when the call network is the VoLTE network, a use time of the VoLTE network is greater than a timeout time, and a signal intensity of the VoWiFi network reaches a preset first signal threshold value, wherein the timeout time is extended with a number of switching the call network; and switching the VoWiFi network which is currently used by the mobile terminal to the VoLTE network when the call network is the VoWiFi network and a signal intensity of the VoLTE network reaches a preset second signal threshold value.

Further, in the mobile terminal, the timeout time is a Fibonacci sequence of the number of switching the call network.

Further, in the mobile terminal, before the operation of identifying the call network which is currently used by the mobile terminal when the IMS voice call is executed by the mobile terminal, the processor is further configured to call the instructions in the storage device to perform operations of:

presetting the first signal threshold value configured to determine whether to switch the call network from the VoLTE network to the VoWiFi network; and presetting the second signal threshold value configured to determine whether to switch the call network from the VoWiFi network to the VoLTE network.

Further, in the mobile terminal, the operation, performed by the processor, of identifying the call network which is currently used by the mobile terminal when the IMS voice call is executed by the mobile terminal includes:

initiating an IMS voice call function when the mobile terminal receives an operational command; and acquiring and identifying the call network which is currently used by the mobile terminal.

Further, in the mobile terminal, the operation, performed by the processor, of switching the VoLTE network which is currently used by the mobile terminal to the VoWiFi network when the call network is the VoLTE network, the use time of the VoLTE network is greater than the timeout time, and the signal intensity of the VoWiFi network reaches the preset first signal threshold value includes:

calculating the use time of the VoLTE network and determining whether the use time of the VoLTE network is greater than the timeout time when it is identified that the call network which is currently used by the mobile terminal is the VoLTE network;

acquiring the current signal intensity of the VoWiFi network and comparing the current signal intensity of the VoWiFi network to the preset first signal threshold value when the use time of the VoLTE network is greater than the timeout time; otherwise, calculating the use time of the VoLTE network again and determining whether the use time of the VoLTE network is greater than the timeout time; and switching the VoLTE network which is currently used by the mobile terminal to the VoWiFi network when the current signal intensity of the VoWiFi network is greater than or equal to the first signal threshold value; otherwise, acquiring the current signal intensity of the VoWiFi network again and comparing the current signal intensity of the VoWiFi network to the preset first signal threshold value.

Further, in the mobile terminal, after the operation, performed by the processor, of switching the VoLTE network which is currently used by the mobile terminal to the VoWiFi network when the current signal intensity of the VoWiFi network is greater than or equal to the first signal threshold value, the processor is further configured to call the instructions in the storage device to perform operations of:

increasing the number of switching the call network by one and recording a current time at which the call network is switched after the call network of the mobile terminal is switched from the VoLTE network to the VoWiFi network.

Further, in the mobile terminal, the operation, performed by the processor, of calculating the use time of the VoLTE network and determining whether the use time of the VoLTE network is greater than the timeout time when it is identified that the call network which is currently used by the mobile terminal is the VoLTE network includes:

acquiring a current time, time at which the call network is switched the last time, and the number of switching the call network when it is identified that the call network which is currently used by the mobile terminal is the VoLTE network;

calculating a time difference between the current time and the time at which the call network is switched the last time, wherein the time difference is the use time of the VoLTE network; and calculating the timeout time according to the acquired number of switching the call network, wherein the timeout time is a Fibonacci sequence of the number of switching the call network.

Further, in the mobile terminal, the operation, performed by the processor, of switching the VoWiFi network which is currently used by the mobile terminal to the VoLTE network when the call network is the VoWiFi network and the current signal intensity of the VoLTE network reaches the preset second signal threshold value includes:

acquiring the current signal intensity of the VoLTE network and comparing the current signal intensity of the VoLTE network to the preset second signal threshold value when it is identified that the call network which is currently used by the mobile terminal is the VoWiFi network; and switching the VoWiFi network which is currently used by the mobile terminal to the VoLTE network when the current signal intensity of the VoLTE network is greater than or equal to the second signal threshold value; otherwise, acquiring the current signal intensity of the VoLTE network again and comparing the current signal intensity of the VoLTE network to the preset second signal threshold value.

Advantageous effect is described as follows. In the present disclosure, when the call network of the IMS voice call is the VoLTE network, it is determined whether the use time of the VoLTE network is greater than the timeout time. The condition of switching the call network of the mobile terminal from the VoLTE network to the VoWiFi network is met only when the use time of the VoLTE network is greater than the timeout time. As such, a situation that the call network of the mobile terminal is switched to the VoWiFi network having a poor WiFi signal can be prevented. Furthermore, a situation that the call network of the mobile terminal is frequently switched between the VoLTE network and the VoWiFi network during the IMS voice call can be avoided, the quality of the call can be improved, and the power consumption of the mobile terminal can be decreased.

DESCRIPTION OF SPECIFIC EMBODIMENTS OF THE INVENTION

To make the objectives, technical schemes, and technical effect of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
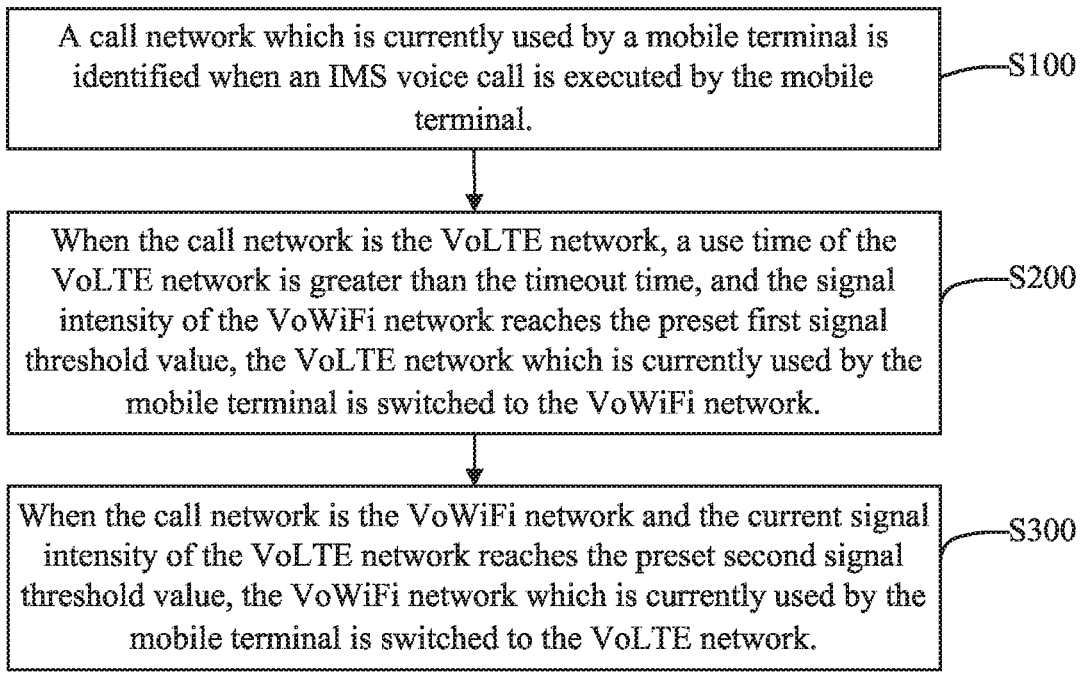
FIG. 1 illustrates a flow chart of a preferred embodiment of a method for switching an IMS voice call network provided by an embodiment of the present disclosure.

As shown in FIG. 1, FIG. 1 illustrates a flow chart of a preferred embodiment of a method for switching an IMS voice call network provided by an embodiment of the present disclosure. The method for switching the IMS voice call network includes the following steps.

In step S100, a call network which is currently used by a mobile terminal is identified when an IMS voice call is executed by the mobile terminal.

In some embodiments, step S100 specifically includes the following steps.

In step S101, an IMS voice call function is initiated when the mobile terminal receives an operational command.

In step S102, the call network which is currently used by the mobile terminal is acquired and identified.

Currently, the mobile terminal supports a function of a WiFi network. When a user executes the IMS voice call, the call network is switched from a VoLTE network to a VoWiFi network after the mobile terminal searches for the WiFi network. The call network is switched frequently. This is inconvenient for the user. Accordingly, in a specific implementation, in order to well determine whether the call network can be switched, the present disclosure presets a first signal threshold value configured to determine whether to switch the call network from the VoLTE network to the VoWiFi network. The present disclosure further presets a second signal threshold value configured to determine whether to switch the call network from the VoWiFi network to the VoLTE network. By presetting the two conditions, the call network is switched only when the signal intensity of the VoLTE network or the signal intensity of the VoWiFi network reaches a specific intensity, thereby avoiding a situation that the call network is switched whenever a network is searched and guaranteeing that quality of the call is not affected. This brings convenience for the user.

In some embodiments, a timeout time is a Fibonacci sequence of a number of switching the call network. Since the timeout time is based on the Fibonacci sequence, values of the timeout time are [1, 1, 2, 3, 5, 8, 13, 21, 34, . . . ]. Accordingly, in the embodiment of the present disclosure, when an environment of the call network is poor, the timeout time is extended significantly with the number of switching the call network, thereby avoiding a situation that the call network is switched frequently, improving the quality of the call, and decreasing the power consumption of the mobile terminal. This brings convenient for the user.

In some embodiments, when the mobile terminal initiates an IMS voice call to another mobile terminal after receiving the operational command from the user, the mobile terminal determines whether the current call network is the VoWiFi network or the VoLTE network by automatically acquiring and identifying the current call network.

In step S200, when the call network is the VoLTE network, a use time of the VoLTE network is greater than the timeout time, and the signal intensity of the VoWiFi network reaches the preset first signal threshold value, the VoLTE network which is currently used by the mobile terminal is switched to the VoWiFi network.

In some embodiments, step S200 specifically includes the following steps.

In step S201, when it is identified that the call network which is currently used is the VoLTE network, the use time of the VoLTE network is calculated and it is determined whether the use time of the VoLTE network is greater than the timeout time.

In step S202, when the use time of the VoLTE network is greater than the timeout time, the current signal intensity of the VoWiFi network is acquired and compared to the preset first signal threshold value. Otherwise, step S201 is performed repeatedly.

In step S203, when the current signal intensity of the VoWiFi network is greater than or equal to the first signal threshold value, the VoLTE network which is currently used by the mobile terminal is switched to the VoWiFi network. Otherwise, step S202 is performed repeatedly.

In a specific implementation, when the mobile terminal identifies that the call network which is currently used is the VoLTE network, the use time of the VoLTE network is calculated according to a preset timeout calculation and it is determined whether the use time of the VoLTE network is greater than the timeout time. In detail, the mobile terminal acquires a current time, time at which the call network is switched the last time, and the number of switching the call network, and the mobile terminal calculates a time difference between the current time and the time at which the call network is switched the last time. The time difference is the use time of the VoLTE network. The use time of the VoLTE network is compared to the timeout time. When the use time of the VoLTE network is greater than or equal to the timeout time, it represents that the condition of switching the call network is met. When the use time of the VoLTE network is shorter than the timeout time, it represents that the condition of switching the call network is not met. That is, the time of switching the call network does not reach, and it is necessary to wait for a period of time. Then, acquiring the current time, the time at which the call network is switched the last time, and the number of switching the call network again, calculating the use time of the VoLTE network and the timeout time again, and comparing the use time of the VoLTE network to the timeout time are repeated until the use time of the VoLTE network is greater than the timeout time.

When the condition of switching the call network is met, the current signal intensity of the VoWiFi network is further acquired and compared to the preset first signal threshold value. A signal coverage range of a WiFi network is small (especially for a user in a family). Basically, a single WiFi signal is used in a family. The signal coverage range of the single WiFi signal is relatively small. The user might be out of the signal coverage range of the WiFi signal during the IMS voice call. In order to avoid that the mobile terminal is switched to the VoWiFi network having a poor WiFi signal, the first signal threshold value is set to assist the mobile terminal to determine whether to switch the call network. When the current signal intensity of the VoWiFi network is greater than or equal to the first signal threshold value, it represents that the current signal intensity of the VoWiFi network is better. The VoLTE network may be switched to the VoWiFi network. Not only the quality of the call is not affected, but also the quality of the call is better using the VoWiFi network. This brings better experiences for the user. When the current signal intensity of the VoWiFi network is smaller than the first signal threshold value, it represents that the current signal intensity of the VoWiFi network is not enough. The call network is not switched. Acquiring the current signal intensity of the VoWiFi network again and comparing the current signal intensity of the VoWiFi network to the first signal threshold value are repeated until the signal intensity of the VoWiFi network is greater than or equal to the first signal threshold value. Then, the call network is switched.

In some embodiments, when the call network of the mobile terminal is switched from the VoLTE network to the VoWiFi network, the number of switching the call network is increased by one and a current time at which the call network is switched is recorded. That is, the number of switching the call network is increased by one after the VoLTE network is switched to the VoLTE network successfully. The current time at which the call network is switched is recorded. As such, when step S201 is repeated, the time at which the call network is switched the last time and the number of switching the call network can be acquired.

In step S300, when the call network is the VoWiFi network and the current signal intensity of the VoLTE network reaches the preset second signal threshold value, the VoWiFi network which is currently used by the mobile terminal is switched to the VoLTE network.

In some embodiments, step S300 specifically includes the following steps.

In step S301, when it is identified that the call network which is currently used by the mobile terminal is the VoWiFi network, the current signal intensity of the VoLTE network is acquired and compared to the preset second signal threshold value.

In step S302, when the current signal intensity of the VoLTE network is greater than or equal to the second signal threshold value, the VoWiFi network which is currently used by the mobile terminal is switched to the VoLTE network. Otherwise, step S301 is performed repeatedly.

In a specific implementation, when the mobile terminal identifies that the call network which is currently used is the VoWiFi network, the current signal intensity of the VoLTE network is acquired and compared to the preset second signal threshold value. Since the VoLTE network is affected by the environment as well, the signal intensity is sometimes strong and sometimes weak. Accordingly, in order to well assist the mobile terminal to determine whether it is necessary to switch the call network from the VoWiFi network to the VoLTE work, the second signal threshold value is set. When the current signal intensity of the VoLTE network is greater than or equal to the second signal threshold value, it represents that the current signal intensity of the VoLTE network is better. The VoWiFi network may be switched to the VoLTE network, so as to improve the quality of the call and bring better experiences for the user. Similarly, when the current signal intensity of the VoLTE is smaller than the second signal threshold value, it represents that the current signal intensity of the VoLTE network is not enough. The call network is not switched. The current signal intensity of the VoLTE network is acquired again, and the current signal intensity of the VoLTE network is compared to the second signal threshold value. The call network is switched until the signal intensity of the VoLTE network is greater than or equal to the second signal threshold value. As such, a situation that the call network of the mobile terminal is frequently switched between the VoLTE network and the VoWiFi network during the IMS voice call can be avoided.

Figure 2:
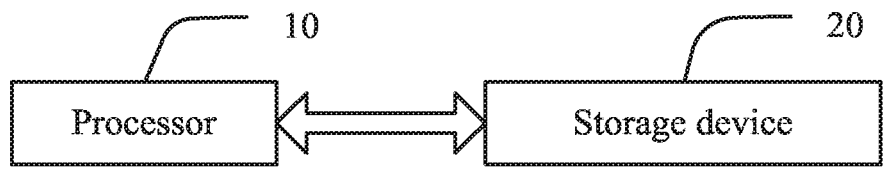
FIG. 2 illustrates a functional block diagram of a preferred embodiment of a mobile terminal provided by an embodiment of the present disclosure.

Based on the above-mentioned embodiment, the present disclosure further provides a mobile terminal as shown in FIG. 2. The mobile terminal includes a processor 10 and a storage device (memory) 20. The processor 10 is configured to call program instructions in the storage device 20 to perform the method provided by the above-mentioned embodiment. For example, the method includes the following steps.

In step S100, a call network which is currently used by the mobile terminal is identified when an IMS voice call is executed by the mobile terminal.

In step S200, when the call network is a VoLTE network, a use time of the VoLTE network is greater than a timeout time, and a signal intensity of a VoWiFi network reaches a first signal threshold value, the VoLTE network which is currently used by the mobile terminal is switched to the VoWiFi network.

In step S300, when the call network is the VoWiFi network and a signal intensity of the VoLTE network reaches a preset second signal threshold value, the VoWiFi network which is currently used by the mobile terminal is switched to the VoLTE network.

The present disclosure further provides a storage device. The storage device stores computer instructions. The computer instructions are executed by a computer to perform the method provided by the above-mentioned embodiments of the present disclosure.

It should be noted that those skilled in the art may understand all or some of the processes in the methods of the embodiments described above can be realized by using programs to instruct corresponding hardware. The programs may be stored in a computer readable storage medium. The storage medium may include read-only memory (ROM), random access memory (RAM), disk, compact disc (CD), or the like.

Figure 3:
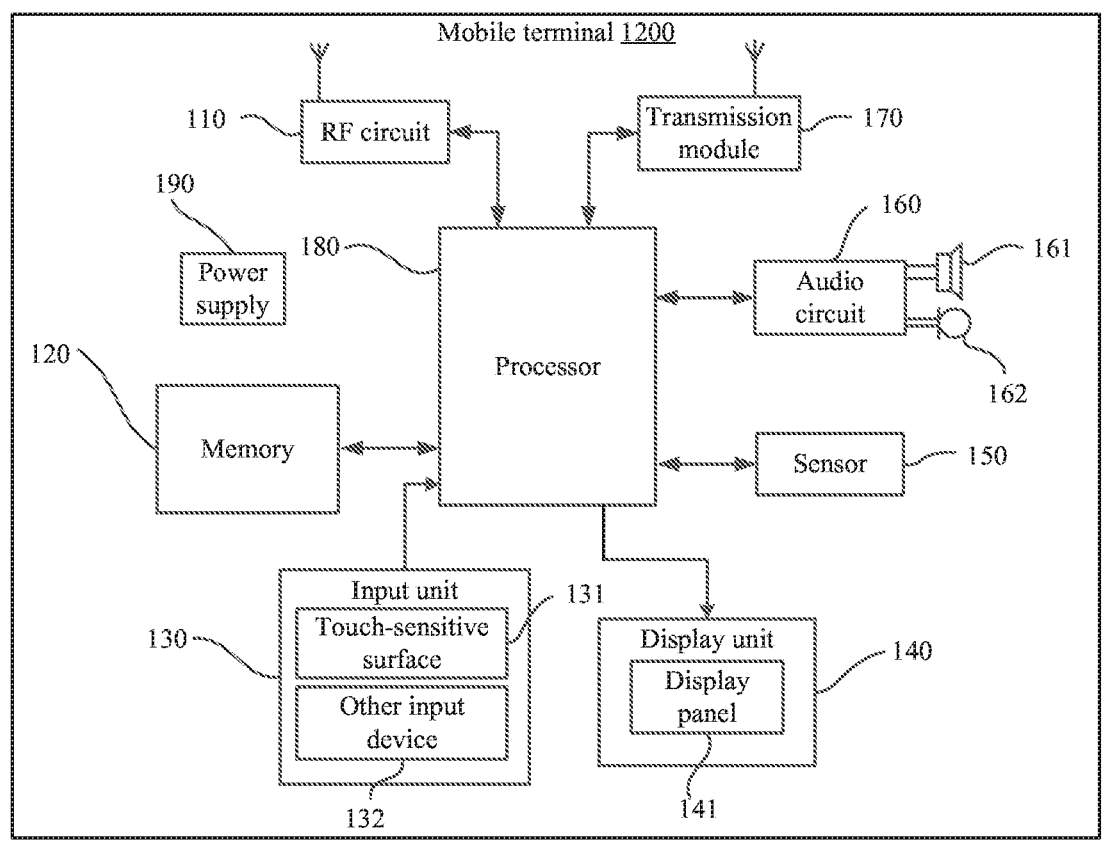
FIG. 3 illustrates a specific structure diagram of a mobile terminal provided by an embodiment of the present disclosure.

FIG. 3 illustrates a specific structure diagram of a mobile terminal provided by an embodiment of the present disclosure. The mobile terminal may be used to implement the method for switching the IMS voice call network provided by the above-mentioned embodiments. The mobile terminal 1200 may be a smart phone or a tablet computer.

As shown in FIG. 3, the mobile terminal 1200 may include a radio frequency (RF) circuit 110, a memory 120 including one or more computer readable storage mediums (only one is shown in FIG. 3), an input unit 130, a display unit 140, at least one sensor 150, an audio circuit 160, a transmission module 170, a processor 180 including one or more processing cores (only one is shown in FIG. 3), a power supply 190 and the like. Those skilled in the art can understand that the mobile terminal 1200 is not limited to the structure shown in FIG. 3, and may include more or fewer parts than those shown in FIG. 3, or some parts may be combined, or different arrangement of parts may be adopted.

The RF circuit 110 is configured to receive and transmit electromagnetic waves and to realize conversions of the electromagnetic waves and electrical signals, thereby communicating with a communication network or any other device. The RF circuit may include various conventional circuit elements used for performing these functions, for example, an antenna, a radio frequency transmitter, a digital signal processor, an encryption/decryption chip, a subscriber identification module (SIM) card, a memory and the like. The RF circuit 110 may communicate with various networks, for example, an Internet, an intranet or a wireless network, or may communicate with any other device via a wireless network. The above-mentioned wireless network may include a cellular telephone network, a wireless local area network or a metropolitan area network. The above-mentioned wireless network may use various communication standards, protocols and technologies and may include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP) Worldwide Interoperability for Microwave Access (Wi-Max), other protocols for E-mail, instant messaging and Short Messaging Service (SMS) and other suitable communication protocols, and may include protocols which are not developed currently.

The memory 120 may be configured to store software programs and software modules, for example, the program instructions/modules corresponding to the method for switching the IMS voice call network in accordance with the above-mentioned embodiments. The processor 180 executes various functional applications and data processing (that is, implements the function of preventing a situation that the network of the mobile terminal is frequently switched between the VoLTE network and the VoWiFi network during the IMS voice call) by operating the software programs and the software modules stored in the memory 120. The memory 120 may include a high speed random access memory and also may include a non-volatile memory, such as one or more disk storage devices, a flash memory device or other non-volatile solid storage devices. In some embodiments, the memory 120 may further include a remote memory disposed corresponding to the processor 180. The remote memory may be connected to the mobile terminal 1200 via a network. Examples of the network include but are not limited to an internet, an intranet, a local area network, a mobile communication network and the combinations of them.

The input unit 130 may be configured to receive input number or character information and to generate keyboard, mouse, joystick, optical or trajectory ball signal inputs related to a user's setting and functional control. In detail, the input unit 130 may include a touch-sensitive surface 131 and other input device 132. The touch-sensitive surface 131, also called a touch display screen or a touch panel, may be configured to detect touch operations of a user on or near the touch-sensitive surface 131 (for example, operations carried out by the user through any suitable objects or attachments, such as a finger, a touch pen and the like, on the touch-sensitive surface 131 or near the touch-sensitive surface 131) and to drive a corresponding device connected therewith according to a preset program. Optionally, the touch-sensitive surface 131 may include a touch detection device and a touch controller. The touch detection device detects the touch direction of the user, detects a signal caused by the touch operation and transmits the signal to the touch controller. The touch controller receives touch information from the touch detection device, converts the touch information into a contact coordinate and then transmits the contact coordinate to the processor 180 and may receive a command transmitted by the processor 180 and execute the command. Moreover, the touch-sensitive surface 131 may be one of various types, such as a resistance type, a capacitance type, an infrared type, a surface acoustic wave type and the like. Besides the touch-sensitive surface 131, the input unit 130 also may include other input device 132. In detail, other input device 132 may include, but is not limited to, one or more of a physical keyboard, function keys (such as a volume control key, a switching key and the like), a trackball, a mouse, a joystick and the like.

The display unit 140 may be configured to display information input by the user or information provided for the user and various graphical user interfaces of the mobile terminal 1200. The graphical user interfaces may be constituted by graphics, texts, icons, videos and any combinations of them. The display unit 140 may include a display panel 141. Optionally, the display panel 141 may be configured in forms of a Liquid Crystal Display (LCD), an Organic Light-Emitting Diode (OLED) and the like. Furthermore, the touch panel 131 may cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. In FIG. 3, the touch-sensitive surface and the display panel 141 are served as two independent parts for accomplishing input and output functions, however, in some embodiments, the touch-sensitive surface 131 and the display panel 141 may be integrated to accomplish the input and output functions.

The mobile terminal 1200 may further include at least one sensor 150, such as a gyroscope sensor, a magnetic induction sensor, an optical sensor, a motion sensor and other sensors. In detail, the optical sensor may include an environmental light sensor and a proximity sensor. The environmental light sensor may adjust brightness of the display panel 141 according to the lightness of environmental light. The proximity sensor may turn off the display panel 141 and/or backlight when the mobile terminal 1200 approaches an ear. As one type of the motion sensor, an accelerometer sensor may detect the value of an acceleration in each direction (generally in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors may be integrated into the mobile terminal 1200, and explanations are not repeated herein.

The audio circuit 160, a speaker 161 and a microphone 162 may provide an audio interface between the user and the mobile terminal 1200. The audio circuit 160 may transmit an electric signal obtained by converting received audio data to the speaker 161. The electric signal is converted into a sound signal to be outputted by the speaker 161. On the other hand, the microphone 162 converts a collected sound signal into an electric signal. The audio circuit 160 receives the electric signal and converts the electric signal into audio data. After the audio data is outputted to the processor 180 and is processed, it is transmitted, for example, to another terminal through the RF circuit 110, or is outputted to the memory 120 in order to be further processed.

The audio circuit 160 may further include an ear plug hole for providing communication between an external ear phone and the mobile terminal 1200.

The mobile terminal 1200 can help the user to receive and send E-mails, browse webpages, access streaming media and the like by the transmission module 170 (for example, a Wi-Fi module). The transmission module 170 provides wireless broadband internet access for the user. Although the transmission module 170 is shown in FIG. 3, it should be understood that the transmission module 170 is not the necessary part of the mobile terminal 1200 and may completely be omitted as required without changing the scope of the present disclosure.

The processor 180 is a control center of the mobile terminal 1200, is connected with all the parts of the whole mobile phone by various interfaces and lines and is configured to execute various functions of the mobile terminal 1200 and process the data by operating the software programs and/or the modules stored in the memory 120, and to call the data stored in the memory 120 so as to carry out integral monitoring on the mobile phone. Optionally, the processor 180 may include one or more processing cores. In some embodiments, the processor 180 may be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor may also be not integrated into the processor 180.

The mobile terminal 1200 further includes the power supply 190 (such as a battery) for supplying power to each part. In some embodiments, the power supply may be logically connected with the processor 180 by a power supply management system, so as to implement functions of charge management, discharge management, power consumption management and the like by the power supply management system. The power supply 190 may further include one or more direct current or alternating current power supplies, recharging systems, power supply failure detection circuits, power converters or inverters, power supply status indicators and the like.

Although not shown in the FIG. 3, the mobile terminal 1200 may further include a camera (for example, a front camera or a rear camera), a BLUETOOTH module, and the like which are not further described herein. In the present embodiment, the display unit of the mobile terminal is a touch screen display, and the mobile terminal further includes a memory and one or more programs. The one or more programs are stored in the memory and configured to be executed by one or more processors to perform the following operations contained in the one or more programs:

identifying a call network which is currently used by the mobile terminal to determine that the call network which is currently used by the mobile terminal is a VoWiFi network or a VoLTE network when an IMS voice call is executed by the mobile terminal;

switching the VoLTE network which is currently used by the mobile terminal to the VoWiFi network when the call network is the VoLTE network, a use time of the VoLTE network is greater than a timeout time, and a current signal intensity of the VoWiFi network reaches a preset first signal threshold value, wherein the timeout time is extended with a number of switching the call network; and switching the VoWiFi network which is currently used by the mobile terminal to the VoLTE network when the call network is the VoWiFi network and a signal intensity of the VoLTE network reaches a preset second signal threshold value.

The timeout time is a Fibonacci sequence of the number of switching the call network.

Before the operation of identifying the call network which is currently used by the mobile terminal when the IMS voice call is executed by the mobile terminal, the processor 180 is further configured to execute the programs to perform the following operations of:

presetting the first signal threshold value configured to determine whether to switch the call network from the VoLTE network to the VoWiFi network; and presetting the second signal threshold value configured to determine whether to switch the call network from the VoWiFi network to the VoLTE network.

The operation, performed by the processor 180, of identifying the call network which is currently used by the mobile terminal when the IMS voice call is executed by the mobile terminal includes:

initiating an IMS voice call function when the mobile terminal receives an operational command; and acquiring and identifying the call network which is currently used by the mobile terminal.

The operation, performed by the processor 180, of switching the VoLTE network which is currently used by the mobile terminal to the VoWiFi network when the call network is the VoLTE network, the use time of the VoLTE network is greater than the timeout time, and the signal intensity of the VoWiFi network reaches the first signal threshold value includes:

calculating the use time of the VoLTE network and determining whether the use time of the VoLTE network is greater than the timeout time when it is identified that the call network which is currently used by the mobile terminal is the VoLTE network;

acquiring the current signal intensity of the VoWiFi network and comparing the current signal intensity of the VoWiFi network to the preset first signal threshold value when the use time of the VoLTE network is greater than the timeout time; otherwise, calculating the use time of the VoLTE network again and determining whether the use time of the VoLTE network is greater than the timeout time; and switching the VoLTE network which is currently used by the mobile terminal to the VoWiFi network when the current signal intensity of the VoWiFi network is greater than or equal to the first signal threshold value; otherwise, acquiring the current signal intensity of the VoWiFi network again and comparing the current signal intensity of the VoWiFi network to the preset first signal threshold value.

After the operation, performed by the processor 180, of switching the VoLTE network which is currently used by the mobile terminal to the VoWiFi network when the signal intensity of the VoWiFi network is greater than or equal to the first signal threshold value, the processor 180 is further configured to execute the programs to perform the following operations of:

increasing the number of switching the call network by one and recording a current time at which the call network is switched after the call network of the mobile terminal is switched from the VoLTE network to the VoWiFi network.

The operation, performed by the processor 180, of calculating the use time of the VoLTE network and determining whether the use time of the VoLTE network is greater than the timeout time when it is identified that the call network which is currently used by the mobile terminal is the VoLTE network includes:

acquiring a current time, time at which the call network is switched the last time, and the number of switching the call network when it is identified that the call network which is currently used by the mobile terminal is the VoLTE network;

calculating a time difference between the current time and the time at which the call network is switched the last time, wherein the time difference is the use time of the VoLTE network; and calculating the timeout time according to the acquired number of switching the call network, wherein the timeout time is a Fibonacci sequence of the number of switching the call network.

The operation, performed by the processor 180, of switching the VoWiFi network which is currently used by the mobile terminal to the VoLTE network when the call network is the VoWiFi network and the signal intensity of the VoLTE network reaches the preset second signal threshold value includes:

acquiring the current signal intensity of the VoLTE network and comparing the current signal intensity of the VoLTE network to the preset second signal threshold value when it is identified that the call network which is currently used by the mobile terminal is the VoWiFi network; and switching the VoWiFi network which is currently used by the mobile terminal to the VoLTE network when the current signal intensity of the VoLTE network is greater than or equal to the second signal threshold value; otherwise, acquiring the current signal intensity of the VoLTE network again and comparing the current signal intensity of the VoLTE network to the preset second signal threshold value.

In summary, the present disclosure provides a method for switching an IMS voice call network, a storage device, and a mobile terminal. The method includes: identifying a call network which is currently used by the mobile terminal when an IMS voice call is executed by the mobile terminal; switching the VoLTE network which is currently used by the mobile terminal to the VoWiFi network when the call network is the VoLTE network, a use time of the VoLTE network is greater than a timeout time, and a current signal intensity of the VoWiFi network reaches a preset first signal threshold value; and switching the VoWiFi network which is currently used by the mobile terminal to the VoLTE network when the call network is the VoWiFi network and a current signal intensity of the VoLTE network reaches a preset second signal threshold value. In the present disclosure, when the call network of the IMS voice call is the VoLTE network, it is determined whether the use time of the VoLTE network is greater than the timeout time. The condition of switching the call network of the mobile terminal from the VoLTE network to the VoWiFi network is met only when the use time of the VoLTE network is greater than the timeout time. As such, a situation that the call network of the mobile terminal is switched to the VoWiFi network having a poor WiFi signal can be prevented. Furthermore, a situation that the call network of the mobile terminal is frequently switched between the VoLTE network and the VoWiFi network during the IMS voice call can be avoided, the quality of the call can be improved, and the power consumption of the mobile terminal can be decreased.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. A method for switching an IMS voice call network, comprising:
   identifying a call network which is currently used by a mobile terminal when an IMS voice call is executed by the mobile terminal;
   switching a VoLTE network which is currently used by the mobile terminal to a VoWiFi network when the call network is the VoLTE network, a use time of the VoLTE network is greater than a timeout time, and a signal intensity of the VoWiFi network reaches a first signal threshold value, wherein the timeout time is a Fibonacci sequence of a number of switching the call network; and
   switching the VoWiFi network which is currently used by the mobile terminal to the VoLTE network when the call network is the VoWiFi network and a signal intensity of the VoLTE network reaches a second signal threshold value.

2. The method for switching the IMS voice call network of claim 1, wherein before the step of identifying the call network which is currently used by the mobile terminal when the IMS voice call is executed by the mobile terminal, the method further comprises:
   presetting the first signal threshold value configured to determine whether to switch the call network from the VoLTE network to the VoWiFi network; and
   presetting the second signal threshold value configured to determine whether to switch the call network from the VoWiFi network to the VoLTE network.

3. The method for switching the IMS voice call network of claim 1, wherein the step of identifying the call network which is currently used by the mobile terminal when the IMS voice call is executed by the mobile terminal comprises:
   initiating an IMS voice call function when the mobile terminal receives an operational command; and
   acquiring and identifying the call network which is currently used by the mobile terminal.

4. The method for switching the IMS voice call network of claim 1, wherein the step of switching the VoLTE network which is currently used by the mobile terminal to the VoWiFi network when the call network is the VoLTE network, the use time of the VoLTE network is greater than the timeout time, and the signal intensity of the VoWiFi network reaches the first signal threshold value comprises:
   calculating the use time of the VoLTE network and determining whether the use time of the VoLTE network is greater than the timeout time when it is identified that the call network which is currently used by the mobile terminal is the VoLTE network;
   acquiring the signal intensity of the VoWiFi network and comparing the signal intensity of the VoWiFi network to the first signal threshold value when the use time of the VoLTE network is greater than the timeout time; otherwise, calculating the use time of the VoLTE network again and determining whether the use time of the VoLTE network is greater than the timeout time; and
   switching the VoLTE network which is currently used by the mobile terminal to the VoWiFi network when the signal intensity of the VoWiFi network is greater than or equal to the first signal threshold value; otherwise, acquiring the signal intensity of the VoWiFi network again and comparing the signal intensity of the VoWiFi network to the first signal threshold value.

5. The method for switching the IMS voice call network of claim 4, wherein after the step of switching the VoLTE network which is currently used by the mobile terminal to the VoWiFi network when the signal intensity of the VoWiFi network is greater than or equal to the first signal threshold value, the method further comprises:
   increasing a number of switching the call network by one and recording a current time at which the call network is switched after the call network of the mobile terminal is switched from the VoLTE network to the VoWiFi network.

6. The method for switching the IMS voice call network of claim 4, wherein the step of calculating the use time of the VoLTE network and determining whether the use time of the VoLTE network is greater than the timeout time when it is identified that the call network which is currently used by the mobile terminal is the VoLTE network comprises:
   acquiring a current time, time at which the call network is switched the last time, and a number of switching the call network when it is identified that the call network which is currently used by the mobile terminal is the VoLTE network;
   calculating a time difference between the current time and the time at which the call network is switched the last time, wherein the time difference is the use time of the VoLTE network; and calculating the timeout time according to the acquired number of switching the call network, wherein the timeout time is a Fibonacci sequence of the number of switching the call network.

7. The method for switching the IMS voice call network of claim 1, wherein the step of switching the VoWiFi network which is currently used by the mobile terminal to the VoLTE network when the call network is the VoWiFi network and the signal intensity of the VoLTE network reaches the second signal threshold value comprises:
acquiring the signal intensity of the VoLTE network and comparing the signal intensity of the VoLTE network to the second signal threshold value when it is identified that the call network which is currently used by the mobile terminal is the VoWiFi network; and
switching the VoWiFi network which is currently used by the mobile terminal to the VoLTE network when the signal intensity of the VoLTE network is greater than or equal to the second signal threshold value; otherwise, acquiring the signal intensity of the VoLTE network again and comparing the signal intensity of the VoLTE network to the second signal threshold value.

8. A storage device, storing instructions, wherein the instructions are loaded and executed by a processor to perform operations of:
identifying a call network which is currently used by a mobile terminal when an IMS voice call is executed by the mobile terminal;
switching a VoLTE network which is currently used by the mobile terminal to a VoWiFi network when the call network is the VoLTE network, a use time of the VoLTE network is greater than a timeout time, and a signal intensity of the VoWiFi network reaches a first signal threshold value, wherein the timeout time is a Fibonacci sequence of a number of switching the call network; and
switching the VoWiFi network which is currently used by the mobile terminal to the VoLTE network when the call network is the VoWiFi network and a signal intensity of the VoLTE network reaches a second signal threshold value.

9. The storage device of claim 8, wherein the step of switching the VoLTE network which is currently used by the mobile terminal to the VoWiFi network when the call network is the VoLTE network, the use time of the VoLTE network is greater than the timeout time, and the signal intensity of the VoWiFi network reaches the first signal threshold value comprises:
calculating the use time of the VoLTE network and determining whether the use time of the VoLTE network is greater than the timeout time when it is identified that the call network which is currently used by the mobile terminal is the VoLTE network;
acquiring the signal intensity of the VoWiFi network and comparing the signal intensity of the VoWiFi network to the first signal threshold value when the use time of the VoLTE network is greater than the timeout time; otherwise, calculating the use time of the VoLTE network again and determining whether the use time of the VoLTE network is greater than the timeout time; and
switching the VoLTE network which is currently used by the mobile terminal to the VoWiFi network when the signal intensity of the VoWiFi network is greater than or equal to the first signal threshold value; otherwise, acquiring the signal intensity of the VoWiFi network again and comparing the signal intensity of the VoWiFi network to the first signal threshold value.

10. The storage device of claim 9, wherein the step of calculating the use time of the VoLTE network and determining whether the use time of the VoLTE network is greater than the timeout time when it is identified that the call network which is currently used by the mobile terminal is the VoLTE network comprises:
acquiring a current time, time at which the call network is switched the last time, and a number of switching the call network when it is identified that the call network which is currently used by the mobile terminal is the VoLTE network;
calculating a time difference between the current time and the time at which the call network is switched the last time, wherein the time difference is the use time of the VoLTE network; and
calculating the timeout time according to the acquired number of switching the call network, wherein the timeout time is a Fibonacci sequence of the number of switching the call network.

11. A mobile terminal, comprising a processor and a storage device communicating with and connected to the processor, wherein the storage device is configured to store instructions, and the processor is configured to call the instructions in the storage device to perform operations of:
identifying a call network which is currently used by the mobile terminal to determine that the call network which is currently used is a VoWiFi network or a VoLTE network when an IMS voice call is executed by the mobile terminal;
switching the VoLTE network which is currently used by the mobile terminal to the VoWiFi network when the call network is the VoLTE network, a use time of the VoLTE network is greater than a timeout time, and a signal intensity of the VoWiFi network reaches a first signal threshold value, wherein the timeout time is extended with a number of switching the call network, and the timeout time is a Fibonacci sequence of the number of switching the call network; and
switching the VoWiFi network which is currently used by the mobile terminal to the VoLTE network when the call network is the VoWiFi network and a signal intensity of the VoLTE network reaches a second signal threshold value.

12. The mobile terminal of claim 11, wherein before the operation of identifying the call network which is currently used by the mobile terminal when the IMS voice call is executed by the mobile terminal, the processor is further configured to call the instructions in the storage device to perform operations of:
presetting the first signal threshold value configured to determine whether to switch the call network from the VoLTE network to the VoWiFi network; and
presetting the second signal threshold value configured to determine whether to switch the call network from the VoWiFi network to the VoLTE network.

13. The mobile terminal of claim 11, wherein the operation, performed by the processor, of identifying the call network which is currently used by the mobile terminal when the IMS voice call is executed by the mobile terminal comprises:
initiating an IMS voice call function when the mobile terminal receives an operational command; and
acquiring and identifying the call network which is currently used by the mobile terminal.

14. The mobile terminal of claim 11, wherein the operation, performed by the processor, of switching the VoLTE network which is currently used by the mobile terminal to the VoWiFi network when the call network is the VoLTE network, the use time of the VoLTE network is greater than the timeout time, and the signal intensity of the VoWiFi network reaches the first signal threshold value comprises:
- calculating the use time of the VoLTE network and determining whether the use time of the VoLTE network is greater than the timeout time when it is identified that the call network which is currently used by the mobile terminal is the VoLTE network;
- acquiring the signal intensity of the VoWiFi network and comparing the signal intensity of the VoWiFi network to the first signal threshold value when the use time of the VoLTE network is greater than the timeout time; otherwise, calculating the use time of the VoLTE network again and determining whether the use time of the VoLTE network is greater than the timeout time; and
- switching the VoLTE network which is currently used by the mobile terminal to the VoWiFi network when the signal intensity of the VoWiFi network is greater than or equal to the first signal threshold value; otherwise, acquiring the signal intensity of the VoWiFi network again and comparing the signal intensity of the VoWiFi network to the first signal threshold value.

15. The mobile terminal of claim 14, wherein after the operation, performed by the processor, of switching the VoLTE network which is currently used by the mobile terminal to the VoWiFi network when the signal intensity of the VoWiFi network is greater than or equal to the first signal threshold value, the processor is further configured to call the instructions in the storage device to perform operations of:
- increasing the number of switching the call network by one and recording a current time at which the call network is switched after the call network of the mobile terminal is switched from the VoLTE network to the VoWiFi network.

16. The mobile terminal of claim 14, wherein the operation, performed by the processor, of calculating the use time of the VoLTE network and determining whether the use time of the VoLTE network is greater than the timeout time when it is identified that the call network which is currently used by the mobile terminal is the VoLTE network comprises:
- acquiring a current time, time at which the call network is switched the last time, and the number of switching the call network when it is identified that the call network which is currently used by the mobile terminal is the VoLTE network;
- calculating a time difference between the current time and the time at which the call network is switched the last time, wherein the time difference is the use time of the VoLTE network; and
- calculating the timeout time according to the acquired number of switching the call network, wherein the timeout time is a Fibonacci sequence of the number of switching the call network.

17. The mobile terminal of claim 11, wherein the operation, performed by the processor, of switching the VoWiFi network which is currently used by the mobile terminal to the VoLTE network when the call network is the VoWiFi network and the signal intensity of the VoLTE network reaches the second signal threshold value comprises:
- acquiring the signal intensity of the VoLTE network and comparing the signal intensity of the VoLTE network to the second signal threshold value when it is identified that the call network which is currently used by the mobile terminal is the VoWiFi network; and
- switching the VoWiFi network which is currently used by the mobile terminal to the VoLTE network when the signal intensity of the VoLTE network is greater than or equal to the second signal threshold value; otherwise, acquiring the signal intensity of the VoLTE network again and comparing the signal intensity of the VoLTE network to the second signal threshold value.

* * * * *